US009917736B2

(12) United States Patent
Jubran et al.

(10) Patent No.: US 9,917,736 B2
(45) Date of Patent: Mar. 13, 2018

(54) AUTOMATED STANDALONE BOOTSTRAPPING OF HARDWARE INVENTORY

(71) Applicant: MICROSOFT CORPORATION, Redmond, WA (US)

(72) Inventors: Marwan E. Jubran, Redmond, WA (US); Aleksandr M. Gershaft, Redmond, WA (US); Vitalii Tsybulnyk, Redmond, WA (US); Vipins Gopinadhan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 552 days.

(21) Appl. No.: 14/496,869

(22) Filed: Sep. 25, 2014

(65) Prior Publication Data
US 2015/0012623 A1  Jan. 8, 2015

Related U.S. Application Data

(63) Continuation-in-part of application No. 13/360,876, filed on Jan. 30, 2012.

(51) Int. Cl.
*G06F 15/177* (2006.01)
*H04L 12/24* (2006.01)
*G06F 15/16* (2006.01)

(52) U.S. Cl.
CPC ........ *H04L 41/0856* (2013.01); *G06F 15/161* (2013.01); *H04L 41/0866* (2013.01);
(Continued)

(58) Field of Classification Search
CPC . H04L 41/08; H04L 12/4641; H04L 61/2061; H04L 29/12283; H04L 49/10;
(Continued)

(56) References Cited

U.S. PATENT DOCUMENTS 7,493,653 B2  2/2009 Klein
7,746,860 B2  6/2010 Tams et al.
(Continued)

FOREIGN PATENT DOCUMENTS

EP  1250785 BI  8/2007
EP  2339778 A1  6/2011
(Continued)

OTHER PUBLICATIONS

"StruxureWareTM Data Center Operation", Retrieved on: Jul. 4, 2014 Available at: http://www2.schneider-electric.com/documents/solutions/struxureware/StruxureWare-data-center-operation_RMCR-8N2PLE_R7_EN.pdf.
(Continued)

*Primary Examiner* — Philip Chea
*Assistant Examiner* — Mohammed Ahmed
(74) *Attorney, Agent, or Firm* — Shook, Hardy & Bacon, L.L.P.

(57) ABSTRACT

Embodiments of the present invention provide systems, methods, and computer storage media for automated standalone bootstrapping of hardware inventory that includes a provisioning workflow of discovering, validating, and configuring hardware inventory. In an exemplary embodiment, an in-rack computing device, such as a chassis manager or selected blade, initializes an intra-rack communication network with a hardware inventory of the rack. The in-rack computing device initiates intra-rack communication with the hardware inventory in the rack, using the intra-rack communication network, to discover at least a set of computing units in a hardware inventory. Intra-rack communications that include traffic received from the set of computing units. The in-rack computing device validates operational configurations of the hardware inventory based on comparing expected operational configuration param-
(Continued)

eters with actual operational configuration parameters, at least a portion of the operational configuration parameters retrieved from the information carried within the traffic received from the set of computing units.

20 Claims, 8 Drawing Sheets

(52) U.S. Cl.
CPC .......... *H04L 41/12* (2013.01); *H04L 41/0853* (2013.01); *Y04S 40/162* (2013.01); *Y04S 40/164* (2013.01)

(58) Field of Classification Search
CPC ..... H04L 41/0806; H04L 43/50; H04L 43/18; H04L 41/12; G06F 15/177
See application file for complete search history.

(56) References Cited

U.S. PATENT DOCUMENTS

| | | | |
|---|---|---|---|
| 8,549,869 | B1 | 10/2013 | Whitted et al. |
| 8,625,596 | B1 | 1/2014 | Thomas et al. |
| 8,949,389 | B1 | 2/2015 | Rimmer |
| 2002/0163901 | A1 | 11/2002 | Spratt |
| 2004/0088145 | A1 | 5/2004 | Rosenthal et al. |
| 2004/0119735 | A1 | 6/2004 | Subbarao et al. |
| 2005/0060413 | A1* | 3/2005 | Oyadomari ......... H04L 12/2697 709/227 |
| 2005/0182601 | A1 | 8/2005 | Deguchi |
| 2005/0216732 | A1 | 9/2005 | Kipnis et al. |
| 2006/0094291 | A1 | 5/2006 | Caveney et al. |
| 2006/0282529 | A1 | 12/2006 | Nordin |
| 2007/0005994 | A1 | 1/2007 | Bahali et al. |
| 2007/0088630 | A1 | 4/2007 | MacLeod et al. |
| 2007/0180059 | A1 | 8/2007 | Marl et al. |
| 2008/0052437 | A1 | 2/2008 | Loffink |
| 2008/0208897 | A1 | 8/2008 | Lew et al. |
| 2008/0259816 | A1 | 10/2008 | Archer et al. |
| 2009/0210735 | A1* | 8/2009 | Brown ................. G06F 1/26 713/330 |
| 2010/0036903 | A1 | 2/2010 | Ahmad et al. |
| 2010/0131948 | A1 | 5/2010 | Ferris |
| 2010/0153482 | A1 | 6/2010 | Kim et al. |
| 2010/0211656 | A1* | 8/2010 | Pagan ................. H04L 49/10 709/220 |
| 2010/0235484 | A1 | 9/2010 | Bolan et al. |
| 2011/0022245 | A1 | 1/2011 | Goodrum et al. |
| 2011/0072255 | A1 | 3/2011 | Gopalakrishnan et al. |
| 2011/0078680 | A1 | 3/2011 | Lagergren et al. |
| 2011/0145392 | A1 | 6/2011 | Dawson et al. |
| 2011/0154123 | A1* | 6/2011 | Barrall ................ G06F 11/0727 714/42 |
| 2011/0172841 | A1 | 7/2011 | Forbes, Jr. |
| 2011/0231822 | A1 | 9/2011 | Sabin et al. |
| 2011/0246793 | A1 | 10/2011 | Davis |
| 2011/0270962 | A1 | 11/2011 | Tameshige et al. |
| 2011/0295633 | A1 | 12/2011 | Bird |
| 2011/0296069 | A1 | 12/2011 | Tarta et al. |
| 2011/0320849 | A1 | 12/2011 | Cochran et al. |
| 2012/0102186 | A1 | 4/2012 | Rewaskar et al. |
| 2012/0151040 | A1 | 6/2012 | Mouravyov et al. |
| 2012/0170585 | A1 | 7/2012 | Mehra et al. |
| 2012/0209981 | A1 | 8/2012 | Bolan et al. |
| 2012/0297037 | A1* | 11/2012 | Kumagai ............ H04L 12/4641 709/222 |
| 2012/0303767 | A1* | 11/2012 | Renzin ................. H04L 41/08 709/220 |
| 2012/0311111 | A1 | 12/2012 | Frew et al. |
| 2013/0007737 | A1 | 1/2013 | Oh et al. |
| 2013/0046884 | A1 | 2/2013 | Frost et al. |
| 2013/0198346 | A1 | 8/2013 | Jubran et al. |
| 2013/0227136 | A1 | 8/2013 | Sturgeon et al. |
| 2014/0039683 | A1 | 2/2014 | Zimmermann et al. |
| 2014/0068057 | A1 | 3/2014 | Burchfield et al. |
| 2014/0101467 | A1 | 4/2014 | Jubran et al. |
| 2014/0119238 | A1 | 5/2014 | Thomas et al. |
| 2014/0173060 | A1 | 6/2014 | Jubran et al. |
| 2014/0298734 | A1 | 10/2014 | Rogers |

FOREIGN PATENT DOCUMENTS

| | | | |
|---|---|---|---|
| EP | 2362578 | A1 | 8/2011 |
| GB | 2421153 | A | 6/2006 |
| JP | H0412353 | A | 4/1992 |
| JP | 2004252800 | A | 9/2004 |
| JP | 2007213271 | A | 8/2007 |
| WO | 2010119370 | A1 | 10/2010 |
| WO | 2011151773 | A1 | 12/2011 |
| WO | 2011159842 | A1 | 12/2011 |

OTHER PUBLICATIONS

"Bootstrapping Applications via AWS CloudFormation", Retrieved on: Dec. 28, 2011, 22 pages Available at:https://s3.amazonaws.com/cloudformation-examples/BoostrappingApplicationsWithAWSCloudFormation.pdf.
"Configuring the Hardware and Software Inventory SMS Feature", Retrieved on: Dec. 30, 2011, 6 pages Available at:http://www.tech-faq.com/configuring-the-hardware-and-software-inventory-sms-feature.html.
"Just Released: StockTrader 5.0, Windows Azure Platform End-to-End Sample Application", Published on: Jun. 30, 2011, 1 page Available at:http://blogs.msdn.com/b/windowsazure/archive/2011/06/30/just-released-stocktrader-5-0-windows-azure-plafform-end-to-end-sample-application.aspx.
"System Imaging", Retrieved on: Jul. 20, 2011, 2 pages Available at:http://itservices.stanford.edu/strategy/sysadmin/imaging.
"Understanding Systems Management Server (SMS)", Retrieved on: Dec. 29, 2011, 11 pages, Available at:http://www.tech-faq.com/understanding-systems-management-server-sms.html.
"Vyatta Network OS for Cloud Computing", Retrieved on: Dec. 28, 2011, 3 pages Available at:http://www.vyatta.com/sites/vyatta.com/files/pdfs/vyatta_cloud_datasheet_pdf.
"Windows Azure Bootstrapper", Retrieved on: Dec. 28, 2011, 2, pages Available at:http://bootstrap.codeplex.com/.
Bourgeau, Paul, "Cloud Security: Managing the Cloud with Windows Intune", Published on: Jun. 2010, 6 pages, Available at:http://technet.microsoft.com/en-us/magazine/ff742836.aspx.
Casado, et al., "Ripcord: A Modular Platform for Data Center Networking", In Proceedings of the ACM SIGCOMM 2010 conference on SIGCOMM, Jun. 7, 2010, 15 pages.
Hirschfeld, et al., "Bootstrapping OpenStack Clouds", Retrieved on: Jul. 20, 2011, 15 pages Available at:http://www.rackspace.com/downloads/pdfs/dell_tech_wp-bootstrapping_openstack_clouds.pdf.
International Search Report and Written Opinion in PCT/US2013/022358, dated Jun. 21, 2013.
Mudigonda, et al., "NetLord: A Scalable Multi-tenant Network Architecture for Virtualized Datacenters", Published on: Aug. 15-19, 2011, 12 pages Available at:http://www.hpl.hp.com/personal/Praveen_Yalagandula/papers/SIGCOMM2011-NetLord.pdf.
Non Final Office Action dated May 8, 2013 in U.S. Appl. No. 13/531,136, 14 pages.
Perera, et al., "A Scalable and Robust Coordination Architecture for Distributed Management", In Department of computer Science Technical Report TR-659, Indiana University, 2008, 10 pages.
Final Office Action dated Jan. 13, 2014 in U.S. Appl. No. 13/531,136, 27 pages.
International Search Report and Written Opinion in PCT/US2013/046670, dated Oct. 9, 2013, 10 pages.
International Search Report and Written Opinion in PCT/US2013/060244, dated Feb. 4, 2014, 16 pages.
"International Search Report & Written Opinion for PCT Patent Application No. PCT/US2013/074742", dated Apr. 4, 2014, Filed Date: Dec. 12, 2013, 14 Pages.

(56) References Cited

OTHER PUBLICATIONS

Non-Final Office Action dated May 12, 2014 in U.S. Appl. No. 13/360,876, 19 pages.
Non-Final Office Action dated Jul. 31, 2014 in U.S. Appl. No. 13/531,136, 13 pages.
Non-Final Office Action dated Aug. 13, 2014 in U.S. Appl. No. 13/647,116, 29 pages.
Final Office Action dated Dec. 9, 2014 in U.S. Appl. No. 13/360,876, 21 pages.
Second Written Opinion of the International Searching Authority dated Dec. 19, 2014 in Application No. PCT/US2013/074742, 10 pages.
Final Office Action dated Feb. 10, 2015 in U.S. Appl. No. 13/531,136, 15 pages.
Notice of Allowance dated Mar. 4, 2015 in U.S. Appl. No. 13/647,116, 9 pages.
"International Preliminary Report on Patentability for PCT Patent Application No. PCT/US2013/074742", dated Mar. 23, 2015, Filed Date: Dec. 12, 2013, 18 Pages.
European Office Action dated Mar. 3, 2015 in EP Application No. 13734578.1, 2 pages.
Non-Final Office Action dated May 21, 2015 in U.S. Appl. No. 13/715,273, 12 pages.
European Office Action dated May 18, 2015 in EP Application No. 13771681.7, 2 pages.
Supplementary Search Report Issued in European Patent Application No. 13743254.8, dated May 29, 2015, 5 Pages.
International Search Report & Written Opinion Issued in PCT Application No. PCT/US2015/051291, dated Oct. 23, 2015, 13 Pages.
Notice of Allowance dated Jan. 14, 2016 in U.S. Appl. No. 13/715,273, 5 pages.
Notice of Allowance dated Dec. 16, 2016 in U.S. Appl. No. 13/360,876, 20 pages.
Final Office Action dated Jul. 20, 2017 in U.S. Appl. No. 13/531,136, 26 pages.
Non-Final Office Action dated Jun. 9, 2016 in U.S. Appl. No. 13/360,876, 23 pages.

* cited by examiner

AUTOMATED STANDALONE BOOTSTRAPPING OF HARDWARE INVENTORY

CROSS-REFERENCE TO RELATED APPLICATIONS

This application is a continuation-in-part of, and claims priority to, U.S. patent application Ser. No. 13/360,876, filed Jan. 30, 2012, entitled "AUTOMATED BUILD-OUT OF A CLOUD-COMPUTING STAMP," which is incorporated herein by reference in its entirety.

BACKGROUND

Generally, distributed service applications are hosted in cloud-computing networks (across various nodes) and are intended primarily to promote high availability through redundancy of service-application components, dynamic scalability, and auto-healing functionality. These service applications are often divided into portions that include a group of service-application components. These service-application components may be hosted throughout nodes (e.g., physical machines and virtual machines) of one or more data centers. Often, there exists a need to create or expand the computing/storage capacity of these data centers to accommodate usage demands of the service applications and to help ensure that an entire service application does not become unavailable due to lack of support for the underlying hardware.

Expansion of data centers may involve various scenarios, such as configuring a new set of hardware or reconfiguring an existing set of hardware to operate in concert with existing nodes within the data centers. In one example, a new set of racks that each accommodates a plurality of blades may be bootstrapped independently and optionally thereafter integrated within a fabric that interconnects data center nodes. It is important that the hardware in the new set of racks, for example, network device (L2/3 switches, routers), power and serial devices, and blades are properly provisioned—i.e., assembled and prepared using an automated process that limits human intervention.

When conducting an expansion of a data center, the steps for provisioning the new hardware for the data center are sometimes manually conducted. These manually conducted steps are often time-consuming, ineffective, and inconsistent in result, as such, potentially leading to waste of resources on new hardware that was not properly provisioned or cause delay when hardware components have to be replaced. Accordingly, an automated standalone process for bootstrapping that includes a provisioning workflow that discovers, validates, and configures a set of hardware would help achieve efficient and robust provisioning of hardware inventory.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein are directed to methods, systems, and computer storage media for performing automated standalone bootstrapping of hardware inventory. A provisioning workflow of standalone bootstrapping includes discovering, validating, and configuring that hardware. In an exemplary embodiment, a built-in computing device (e.g., chassis manager or selected blade) built into a rack, initializes an intra-rack communication network with the hardware inventory of the rack. Different types of intra-rack communications networks (e.g., front-end network, back-end network, embedded rack networks) are contemplated with embodiments described herein. The built-in computing device initiates intra-rack communication with the hardware inventory in the rack, using the intra-rack communication network, to discover at least a set of computing units in the hardware inventory. Intra-rack communications that includes traffic, received from the set of computing units. The traffic of the intra-rack communications can be securely isolated from an external infrastructure. The built-in computing device validates operational configurations of the hardware inventory. In embodiments, the built-in computing device accesses a template file that describes a topology schema of the hardware inventory and validates the locations of the set of computing units by comparing the template file against information carried within the traffic received from the set of computing units and further validates operational configuration parameters based on expected and actual bandwidth, throughput, latency, jitter, error rates, and interplay of factors.

BRIEF DESCRIPTION OF THE DRAWINGS

The present invention is described in detail below with reference to the attached drawing figures, wherein.

DETAILED DESCRIPTION

Figure 1:
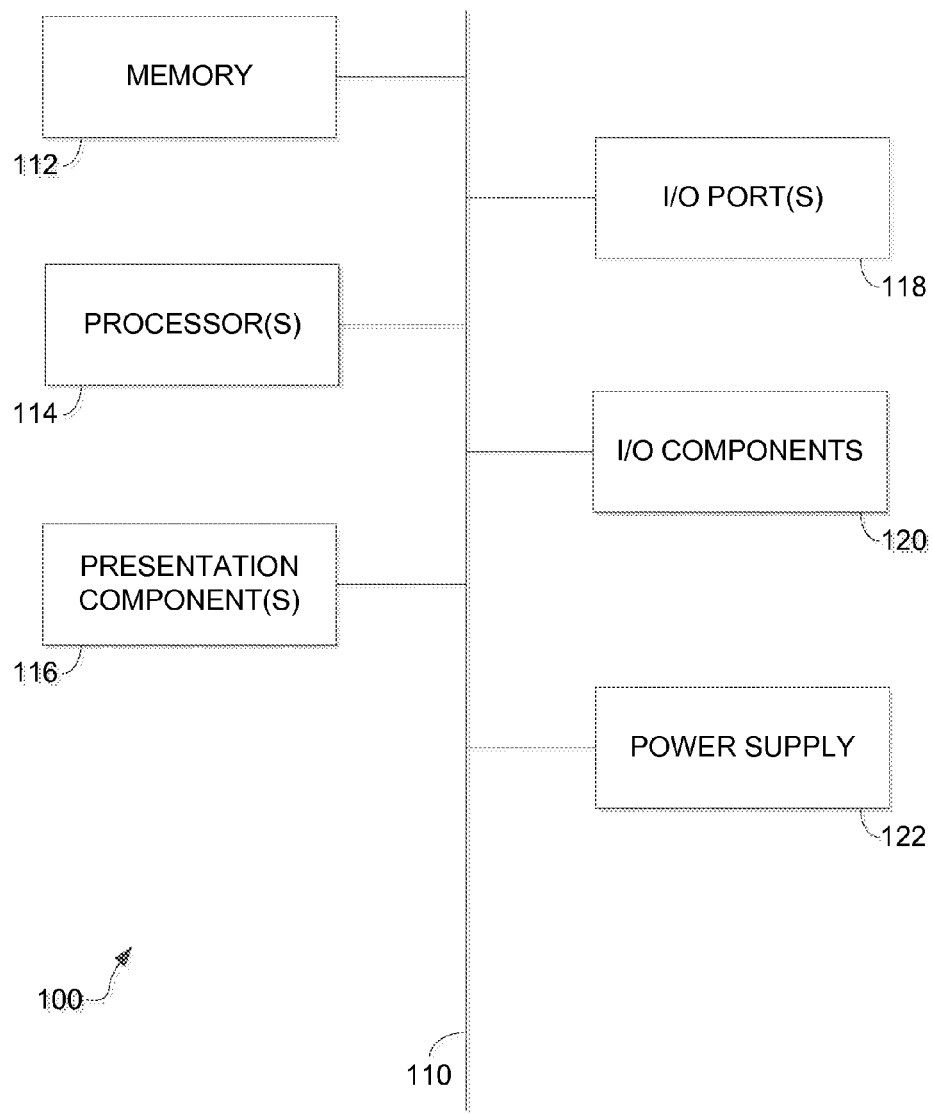
FIG. 1 is a block diagram of an exemplary computing environment suitable for use in implementing embodiments described herein.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments are described with reference to a standalone bootstrapping process that includes provisioning in-rack hardware inventory based on a provisioning workflow for a standalone deployment or a datacenter. The standalone bootstrapping and provisioning workflow may be used for bootstrapping and provisioning new in-rack hardware inventory for a variety of different types of hardware services and a standalone deployment or datacenter bootstrapping is merely exemplary. It is contemplated that the techniques described may be extended to other implementation contexts.

A bootstrapping framework can refer to a comprehensive workflow to discover, verify, and configure devices, racks, and data centers to enable the bootstrap and deployment of a cloud-computing fabric to manage the hardware inventory including computing units and network devices. Generally, a bootstrapping framework can include discovering serial and network connectivity to serial devices based on a range of ports, discovering a power distribution unit (PDU) to verify serial and network connectivity to the PDU, and discovering blades to check the wiring of the blades, harvest MAC addresses, and check blade stock keeping units (SKUs). The bootstrapping framework bootstraps hardware inventory in a rack that is wired into a front-end, management network, out-of-band networks, or network devices and then fully configures the hardware inventory with appropriate configurations. In this regard, the bootstrapping process depends on several additional configuration steps that are complex and time-consuming without providing a basic automated and standalone discovery, validation, and configuration.

Embodiments described herein provide a simple and efficient standalone bootstrapping and provisioning workflow for provisioning of hardware inventory. The provisioning workflow includes discovering, validating, and configuring hardware inventory, advantageously in advance of a datacenter deployment of the hardware inventory or an autonomous deployment of the hardware inventory. Several different provisioning ecosystems that refer to interconnected hardware and software components may facilitate the provisioning workflow. The provisioning workflow is advantageously implemented based on these standalone provisioning ecosystems, in contrast to an end-to-end bootstrapping framework. As such, the standalone bootstrapping and provisioning workflow may be performed at an OEM (original equipment manufacturer) location, at a data center location, or any other location where the in-rack hardware may receive power. The standalone bootstrapping process may refer to the self-sustained process that includes the provisioning workflow which can be described as a plug and play implementation in that the provisioning workflow facilitates the preparation of a hardware inventory based on automated processes.

Standalone bootstrapping with embodiments described herein generally refers to identifying, supplying, arranging, and preparing a hardware inventory based at least in part on the discovery, validation, and configuration steps described herein. A standalone bootstrapping process provides for detecting issues early at the source or at delivery time to avoid build-out delays due to hardware problems later in a provisioning workflow. As used herein, the phrase hardware inventory is not meant to be limited to any particular configuration of components, but broadly refers to any compilation of devices (e.g., network devices, computing devices, and power-supply devices) in a rack. In one instance, the rack may be configured to operate in a standalone manner without interaction with a cloud provider, such that the rack may be self-managed (e.g., an Internet service provider (ISP), office building, and mall). In another instance, the rack may be eventually integrated within a computing fabric.

The bootstrapping and provisioning workflow acts as the first quality gatekeeper in discovering, validating, and configuring a hardware inventory. Bootstrapping in particular supports validation of operational configuration of a hardware inventory. Operational configuration refers to the arrangement, disposition, and attributes of the hardware inventory that support functionality thereof. Validation of operational configurations of the hardware inventory is based on comparing expected operational configuration parameters, or thresholds associated therewith, with actual operational configuration parameters, at least a portion of the operational configuration parameters retrieved from the information carried within the traffic received from the set of computing units. Validation may further specifically include validating chassis, wiring, devices, and blades within a rack, performing smoke tests for in-rack components and running hard disk drive or SSD burn-in tests, configuring chassis, wiring, devices, and blade in a rack, and updating devices, blades, and hardware BIOS and firmware.

In this regard, operational configuration parameters include values associated with performance such as bandwidth (maximum rate information is transferred), throughput (actual rate information is transferred), latency (delay between sender and receiver), jitter (variation in arrival time of information), error rates (number of corrupted bits), and interplay of factors of the hardware inventory. Operational configuration parameter can also include values associated with hardware inventory characteristics for a vendor-provided rack. The hardware inventory characteristics can be based at least in part on a given SKU specification. In embodiments, the rack and components described in the SKU specification are specifically approved components for the performance and attributes. A SKU refers to an expected operational configuration for particular hardware; the SKU may embody the attributes (e.g., manufacturer, product description, BIOS, firmware, configuration, material, size, color, packaging, number of HDD, versions, model, and warranty terms) associated with the hardware and distinguish the hardware from other hardware. It is contemplated that a SKU can also refer to a unique identifier or code that refers to the particular stock keeping unit. Other types of operation configuration parameters are contemplated with embodiments of present invention. In one embodiment, a template file that describes a topology schema of the hardware inventory can be used validate operation configuration (e.g., a physical topology of the locations of the set of computing units) by comparing the template file against information carried within the traffic received from the set of computing units.

With reference to the hardware inventory, the hardware inventory may be located within a private enterprise network managed by a customer of a cloud-computing-network service provider, where implementing the provisioning workflow and then a bootstrap process as allows for remote reachability between the data center and the private enterprise network. In another example, the hardware inventory may be located within the data center managed by the cloud-computing-network service provider, where implementing the provisioning workflow and then a bootstrap process allows for building out local storage/computing capacity of the data center.

A reporting mechanism of the provisioning workflow handles procedures and routines for receiving and communicating status and events associated with a hardware inventory. It is contemplated that the status or events of the hardware inventory can be specifically based on validation steps described herein associated with the hardware inventory. The reporting mechanism can be iterative, with a rapid feedback loop, to report hardware issues to operators or OEM vendors, and provide the capacity to re-run validation and configuration for failed or repaired hardware. The reporting mechanism may utilize LED lights and LED screens (e.g., scrolling text signs) on the hardware inventory (e.g., chassis manager or the blades) to report availability of devices. The reporting mechanism may further be configured to send alerts through the network to some other location (with report or just error information) and alerts could be delivered to the operator through a variety of means, such as pager, cell calls, email. Further, the OEM technicians may be expected to run the provisioning workflow as part of handing off the server racks to a requester of the hardware inventory. A datacenter team performing a build-out may then accept the racks upon a successful execution of the provisioning workflow.

In embodiments described herein, the provisioning workflow excludes any special serial or management network outside of a particular rack. In this regard, the provisioning workflow is independent of an external infrastructure and can be specifically isolated using a wiring configuration. In exemplary isolated provisioning ecosystems, an in-rack chassis manager or user device may initialize an intra-rack communication network of interconnected hardware inventory in the rack. Initializing the intra-rack network includes identifying network parameters for configuring the hardware inventory within the rack to exclude an external networking infrastructure. The chassis manager or user device can execute a bootstrapping service facilitate the bootstrapping via a direct connection to the rack TOR switch. It is contemplated that a selected hardware inventory (e.g., blade in the rack) may perform the functionality of the chassis manager, as discussed in more detail below. It is also contemplated that the user device may be connected to the TOR via an additional switch as discussed in more detail below.

Eliminating a special serial or management network in the intra-rack communication network can be based on a preliminary configuration of the hardware inventory. The preliminary configuration of the hardware configuration may include settings specifically for a TOR and in-rack serial devices. The TOR switch may be configured with a static management IP for access from the chassis manager or user device. The TOR switch may be configured to provide an IP to itself via DHCP (dynamic host configuration protocol). The in-rack serial devices may be configured to request IP via DHCP. A chassis manager or user device may also be connected to the TOR switch through serial to configure the TOR switch IP through the serial interface. It is further contemplated that a direct serial connection to the TOR switch may be made available without any connection to any networks.

In an exemplary embodiment, the standalone bootstrapping and provisioning workflow is run before server racks are connected to a data center network and management infrastructure (e.g., network spines, serial aggregators), so server racks can be validated in a standalone mode. In addition, the provisioning workflow is run before cross-rack network device connectivity is established to provide simple data center networking configuration. Specifically, configuring VLANs and IP helpers is delayed until after the provisioning workflow. In-rack hardware inventory with non-default configurations may prevent a provisioning service from running. In this regard, it is contemplated that the hardware inventory will have initial factory default settings (e.g., configured by an OEM vendor). The provisioning workflow includes accessing a TOR management port for network validation. As such, a provisioning service is provided access to the TOR uplink. Upon completion of a provisioning workflow, a bootstrap framework process may follow to build out the hardware inventory in a data center.

Accordingly, in a first embodiment described herein, a computer-implemented method for standalone bootstrapping hardware inventory in racks is provided. The method includes initializing, using a chassis manager, an intra-rack communication network with a hardware inventory in a rack. The method also includes initiating, in the intra-rack communication network, communication between the chassis manager and the hardware inventory in the rack to discover the hardware inventory in the rack. The intra-rack communication comprises traffic received from at least a set of computing units. The method further includes validating operational configurations of the hardware inventory based on comparing expected operational configuration parameters with actual operational configuration parameters, at least a portion of the operational configuration parameters compared based on the template file and the information carried within the data packets received from the set of computing units.

In a second embodiment described herein, one or more computer storage media storing computer-useable instructions that, when used by one or more computing devices, causes the one or more computing devices to perform a method for standalone bootstrapping rack hardware inventory. The method includes determining that a top-of-rack (TOR) switch is accessible via a serial-based connection. The method also includes determining whether a configuration of the TOR switch is a default configuration or a custom configuration, such that when a TOR switch is in a default configuration a provisioning service proceeds with provisioning the TOR switch for discovery, validation, and configuration of the hardware inventory, and such that when a TOR switch is in a custom configuration, the provisioning service terminates provisioning the TOR switch.

The method also includes initializing an intra-rack communication network with TOR switch and additional hardware inventory in a rack. The method further includes instructing the TOR switch and the serial-access device to listen for signals to discover a set of computing units that are interconnected between the TOR switch and the serial-access device. The method also includes configuring the serial-access device to direct the set of computing units to recursively send traffic to the TOR switch. The method includes accessing a template file that describes physical topology of the hardware inventory and validating locations of the set of computing units, respectively, by comparing the template file against information carried within the traffic received from the set of computing units.

In a third embodiment described herein, a computer system for performing a method for standalone bootstrapping rack hardware inventory is provided. The computer system includes a rack. The rack includes at least one network device residing within the rack. The at least one network device is selected from (a) a top-of-rack (TOR) switch for sending data packets over a network-based connection; and (b) a serial-access device for invoking generation of the data packets upon receiving instructions over a serial-based connection. The system further includes a set of blades inserted within the rack. The set of blades include the one or more computing units that are configured to individually generate data packets upon respectively receiving power. The system also includes a power distribution unit (PDU) for selectively supplying power to the set of blades.

The system includes at least one provisioning service device, the provisioning service device selected from one of: a built-in chassis manager or selected blade that is communicatively coupled to the TOR switch via the network-based connection; and a user device that is communicatively coupled to the TOR switch via the network-based connection to the serial-access device via the serial-based connection. The built-in chassis manager and the user device are configured to perform a provisioning. Provisioning includes (a) discovering the network devices and the set of blades; and (b) validating operational configurations of the hardware inventory based on comparing expected operational configuration parameters with actual operational configuration parameters, at least a portion of the operational configuration parameters compared based on the template file and the information carried within the data packets received from the set of computing units. It is contemplated that the user device in one embodiment may be a computing unit within the set of computing unit, where the selected computing unit is configured to perform provisioning operations described herein.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

An end-to-end bootstrapping process for establishing interoperation between an inventory of hardware and a cloud-computing fabric of a data center may be performed in several phases. A user device along with the hardware inventory, data center, and/or other network device act in concert to form various ecosystems that each implements one or more phases of the bootstrap process. The phases of a bootstrap process are described in patent application Ser. No. 13/360,876, filed Jan. 30, 2012, and entitled, AUTOMATED BUILD-OUT OF A CLOUD-COMPUTING STAMP, incorporated herein in its entirety.

Generally, the end-to-end bootstrapping framework provides a comprehensive automated end-to-end process to discover, verify, and configure devices, racks, and data centers to enable the bootstrapping and deployment of a cloud computing fabric to manage the hardware inventor and network devices. In comparison, embodiments described herein automate standalone bootstrapping of hardware inventory of a standalone provisioning ecosystem using standalone provisioning operations for discovery, validation, and configuration of hardware inventory in a rack. For example, an end-to-end bootstrap process may include specifying an initial set-up of the hardware inventory that results in generating the logical/physical configuration needed to deploy a fabric network, compared to a standalone bootstrapping process having a provisioning workflow that includes specifying an initial set-up of the hardware inventory that results in preparing the initial set-up of the hardware inventory of a rack.

A chassis manager or user device may execute a provisioning service to facilitate provisioning the hardware inventory, in accordance with embodiments described herein. As such, the provisioning workflow may gain an understanding about an initial configuration of the hardware inventory to validate the initial configuration of the hardware inventory, ensuring the hardware inventory corresponds with an expected hardware layout (e.g., device locations, IP addresses, VLANs, and wiring) independently of data center infrastructure, and specifically a data center networking components.

In one embodiment, it is contemplated that a selected blade in the hardware inventory may be configured for performing a provisioning workflow. A selected chassis manager from a plurality of chassis manager in a rack can also be selected for performing a provisioning workflow. The blade or chassis manager may be selected based on a leader election mechanism. A leader election mechanism defines the procedures and routines for identifying a selected blade or chassis manager that utilized to perform the provisioning workflow. A leader selection mechanism may be based on a physical coupling or wiring of the blade or chassis manager to within the rack (e.g., to a TOR switch) such that it distinguishes the blade or chassis manager and makes it readily identifiable as the leader. In another embodiment, a leader election mechanism can be a leader-election protocol (e.g., via broadcasting). By way of example, a leader-election protocol process can designate a blade or chassis manager as a leader for provisioning operations. As such, a plurality of blades or chassis managers within a hardware inventory can be configured to perform a method to detect which blade or chassis manager is a designated provisioning blade or chassis manager used in the provisioning role. In this regard, the blade may perform provisioning functions of the chassis manager or the user device as described herein.

Figure 2:
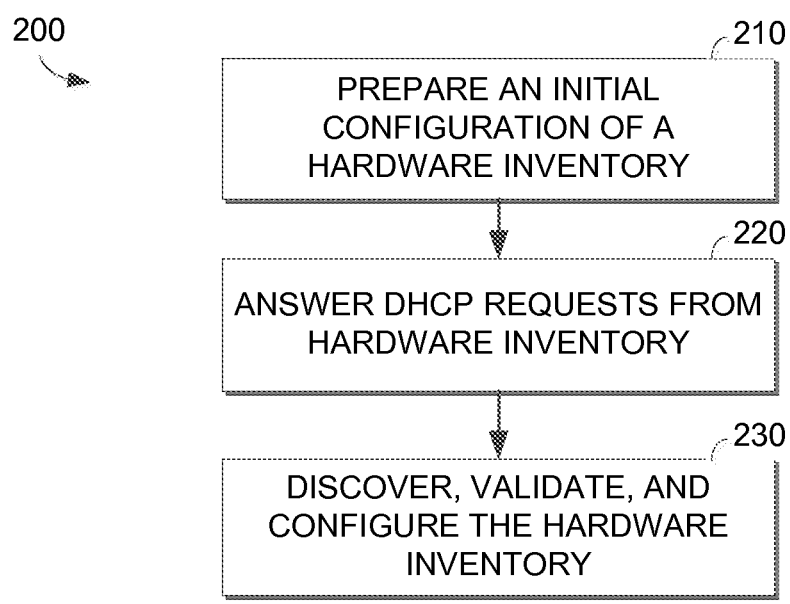
FIG. 2 is a flow diagram showing a method for performing automated standalone bootstrapping of hardware inventory in accordance with embodiments described herein.

With reference to FIG. 2, FIG. 2 illustrates a high level provisioning workflow in accordance with embodiments of the present invention. Initially, at step 210, an initial configuration for the hardware inventory may be prepared for the provisioning workflow. By way of example, a hardware inventory for a rack may be identified based on a template file. The template file may include specific SKUs for the hardware inventory. The provisioning workflow prepares an initial configuration based on a specified original set-up of the hardware inventory as a template file that is consulted during validation. Initially, an original equipment manufacturer (OEM) is expected (e.g., as part of a contract for goods) to verify inter-device wiring prior to shipping a hardware inventory. Further, the OEM may be expected to employ tools that provide a manifest describing attributes of configurations and/or software installed within the devices of the hardware inventory. The wiring verification and software-attribute manifest are maintained in association with the hardware inventory for assisting in the selection of an appropriate hardware inventory.

In a practical exemplary scenario, an order for a hardware inventory may be initiated automatically or manually by an administrator to remedy a storage/computing capacity deficiency. In one instance, initiating the order involves generating a form (e.g., XML document) with nonspecific data surrounding a set of equipment (e.g., devices, racks, and software) targeted to fulfill the capacity deficiency. Preliminary values may be entered onto the form automatically or manually by the administrator, where the preliminary values reflect datacenter specific details (e.g., VLAN range, port range, and IP addresses) or a customer-defined topology schema. The topology schema defines a type, quantity, and wiring pattern of the hardware and network devices of the hardware inventory and indicates additional information used for running the devices (e.g., number of racks, VLAN range, number of ports, and supporting resources).

Upon entry of the values, the form may be converted into a symbolic representation. The symbolic representation serves as a high-level, logical blueprint of equipment (e.g., devices) and the routing (e.g., wiring) therebetween. For example, the symbolic representation may indicate which pieces of equipment are grouped within a common VLAN.

The symbolic representation may be sent to the OEM, customer, or administrator—based on the scenario—to select an appropriate hardware inventory. In one instance, selection of the appropriate hardware inventory includes comparing the symbolic representation against the wiring verification and/or the software-attribute manifest that are maintained in association with hardware inventories at the OEM. Upon selecting the appropriate hardware inventory, the selected hardware inventory may be checked using a provisioning workflow via a provisioning service provided to OEM by the customer or administrator. In embodiments, the provisioning service can also be run at a factory prior to shipment, at the delivery dock upon the arrival of the hardware inventory to data center, which occurs before OEM hand-off. This early checking can detect any issues that may have been introduced to the hardware inventory during transport.

After shipping from the OEM, the administrator may visually validate that devices and wiring of the devices satisfies the symbolic representation upon taking delivery of the hardware inventory. Further, the administrator may visually inspect the wiring (e.g., serial and network cable connectivity) of the hardware inventory, determine actual values (e.g., port numbers, IP addresses, VLAN membership, and device locations) of the hardware inventory based on the inspection, and replace/convert the preliminary values entered within the symbolic representation with the actual values. Besides manual inspection by the administrator, the inspection may be automated if device drivers for network devices are available, where automation can be used to configure the network devices per the symbolic representation specification. This symbolic representation with the preliminary values that are replaced during a bootstrap process by or converted to actual values mined from the delivered hardware inventory is referred to herein as the "template file." As more fully discussed below, the template file is used to indicate how the user device is connected to hardware inventory and to provide assurance that the hardware inventory is properly configured.

The configuration preparation may further include identifying a list of IP addresses to assign to the hardware inventory. The IP addresses can be used to respond to dynamic host configuration protocol (DHCP) requests from the hardware inventory with routable non-conflicting IP addresses. It is contemplated that an in-rack chassis manager or a user device may execute a provisioning service to provide an Application Interface Protocol in the operating system of the chassis manager or the user device to facilitate the provisioning workflow. As such, the initial configuration preparation is generally concerned with identifying initial logical resources for a hardware inventory memorialized in a template file.

At block 220, DHCP requests from the hardware inventory are answered. DHCP requests may specifically be answered for serial devices in the rack. A user device can collect the MAC addresses of serial devices (e.g., a DIGI gateway device) from the TOR MAC table. A MAC address may be added to the provisioning service (e.g., Windows Deployment Services—WDS) as an eligible candidate for configuring an IP address. Specifically, the DHCP requests from the serial devices may be answered with dynamically assigned IP addresses to establish connectivity with a user device. The IP address and subnet masks to be used to answer the DHCP from the hardware inventory can be added to the provisioning service. As discussed further herein, the chassis manager and the user device in different standalone provisioning ecosystems of the hardware inventory may perform operations particularly prescribed for their architectures to support embodiments of the present invention.

At step 230, the hardware inventory is discovered, validated, and configured. In particular, the serial and/or network connectivity to one or more PDUs may be verified. In an architecture that uses a user device, a power distribution unit (PDU) device, which is independent of a chassis manager, is then configured with a static IP using serial access from serial devices, and then discovering and validating network devices, and wiring checks may be implemented on the hardware inventory. In embodiments, it is contemplated that a PDU device may receive an IP based on DHCP. It is further contemplated that a static configuration for IPs associated with the TOR switch, serial-access device, and PDU may be implemented such that static configuration information is received and the devices are accessed accordingly. In this regard, the hardware inventory may be configured based on several different techniques including serial access through an integrated chassis manager or user device, DHCP, or static configuration information. A chassis manager or user device can then communicate with a top-of-rack (TOR) switch using an integrated in-rack mechanism (e.g., network connection to the TOR switch) or a user device can communicate with a top-of-rack (TOR) switch and a serial-access device of the network devices via a serial-based connection and a network-based connection.

Further, the provisioning workflow may involve sending instructions over one or more of the connections that prompt the TOR switch and/or the serial-access device to selectively induce hardware devices (e.g., processors, processing units, computing devices, servers, and blades inserted into a rack) to send traffic to the user device for analysis and may involve the use of a PDU (e.g., a PDU integrated with a chassis manager or an independent PDU) to selectively power-cycle the devices to reset their state. Validating the hardware inventory employs data packets that are carried from the hardware devices to the chassis manager or user device. The provisioning workflow may involve parsing the content (e.g., payload and header) of the data packets to determine the location, absence of, configuration of, and internal connections to the hardware inventory.

In embodiments, provisioning workflow may also send specific workflows, tools, etc. to the various devices and/or blades to perform validation, update and/or configuration of hardware and/or software components (e.g., BIOS and device firmware) within the devices/blades themselves. In other embodiments, the provisioning workflow may execute "smoke tests," which serve to verify components with the devices/blades are functional and meet the predetermined requirements. Further, provisioning workflow may identify the model, manufacturer, and firmware version of devices/blades for recordation and eventual use.

In embodiments, the provisioning workflow further involves discovering a wiring pattern of the blades within the rack, validating the wiring pattern against a predefined template file, and approving the blades configurations. In effect, provisioning the blades helps to ensure that any latent wiring issues or hardware issues (e.g., physical defects missing parts, invalid versions of parts, or improper configuration) within the rack are detected and addressed, thereby ensuring that incorporation of the blades within the data center will not adversely impact the live underlying support being offered by the data center to services running thereon.

During the provisioning of hardware inventory, the chassis manager or user device solicits a status of computing devices (e.g., physical machines and/or virtual machines) aggregated in the hardware inventory. The hardware inventory represents computing device(s) or other devices (e.g., network, PDU, and serial devices). Soliciting the status may involve communicating requests to agents running on the computing devices, respectively, and receiving health information, that indicates a status of the computing devices, in return.

Embodiments described herein contemplate scenarios where the hardware inventory may be deemed unreachable (e.g., inoperable or disconnected) by the chassis manager or user device. If the chassis manager, or user device, are unable to reach a particular computing device for any reason, a reporting mechanism (e.g., a module or component of the provisioning service) provides procedures and routines for managing unreachable hardware inventory. For example, the chassis manager or user device can raise an alert that indicates the hardware inventory is unreachable. Upon recognizing the hardware inventory as unreachable, the chassis manager or user device may initiate an auto-healing procedure. In embodiments, the auto-healing procedure includes at least the steps of validation and a reporting mechanism, described herein, triggered for the unreachable hardware inventory.

The provisioning workflow validation includes verifying configuration settings of components residing within the hardware inventory and cross-referencing a detected physical topology (e.g., links between components and wiring between devices) of the hardware inventory against an expected physical topology (e.g., provided within the template file) of the hardware inventory. As such, the step of validation determines whether the hardware inventory is properly configured. Validation of the hardware inventory further includes: manipulating a flow of power (e.g., turning on and off) to a blade by requesting a serial-access device to selectively drive a power (via a PDU) thereto; gathering information from traffic sent from the manipulated blade; extracting information (e.g., MAC address of the blade) from content of data packets sent within the traffic; and verifying the location and wiring of the blade by evaluating the extracted information against the template file and performing validations.

In an example of selectively driving power to the blade, the chassis manager may turn off power to a range of ports that feed the blades of the unknown/invalid hardware inventory. Next, the chassis manager may operate as the PDU to turn on power to a selected port that links to a subject blade. The chassis manager may then read the MAC address from data packets being sent from the subject blade that is currently sending traffic. Thus, connectivity of the subject blade is verified when the selected port corresponds with an expected port of the template file. Beyond verifying the selected port for receiving power from the PDU, the step of validation may further involve a TOR switch that can determine which port—within a range of ports allocated to the blades of the unknown hardware inventory—is connected to the subject blade. This determination is made by identifying a subject port of the port range that is receiving the data packets being delivered from the subject blade.

A standalone bootstrapping-provisioning ecosystem ("provisioning ecosystem") of the hardware inventory that supports discovering, validating, and configuring network and hardware devices of a hardware inventory will now be discussed with reference to FIGS. 3 and 4. Generally, FIG. 3 depicts a graphical representation illustrating a provisioning ecosystem 300 for discovering, validating, and configuring a first type of topology of the hardware inventory 310 in a rack, while FIG. 4 depicts a graphical representation illustrating a provisioning ecosystem 400 for discovering, validating, and configuring a second type of topology of the hardware inventory 410 in a rack.

As illustrated, the provisioning ecosystem 300 includes the user device 320 that is communicatively coupled with components of the hardware inventory 310. The communicative coupling is organized into a network-based connection and a serial-based connection. The serial-based connection involves a communication path between the user device 320 and the serial-access device 312 via a serial gateway device 340, where the serial gateway device 320 is responsible for properly distributing instructions from the user device 310 to an appropriate serial-access device 312 (e.g., by processing addresses carried within data packets streaming from the user device 320). It is contemplated that the serial-access device 312 can be connected to 316 and/or 314 while excluding the serial gateway device 340.

The network-based connection involves a communication path between the user device 320 and the top-of-rack (TOR) switch 316 via a switch 330, where the switch 330 is responsible for properly delivering data packets from the TOR switch to the user device 310 (e.g., aggregates data packets from multiple network devices). It should be noted that communication with the TOR switch 316 could be done via the serial gateway device 340 as well. Embodiments of the provision ecosystem 300 can exclude a link to an existing infrastructure. Accordingly, when in operation as indicated in FIG. 3, the provisioning ecosystem can be isolated from the rest of an existing infrastructure. In this way, the provisioning ecosystem 300 operates in a self-contained manner that confines messaging to intercommunication between the user device 320 and the hardware inventory 310 in order to ensure proper isolation between the hardware inventory 310 being provisioned. This isolation is useful in at least the following two respects: providing a higher reliability during the provisioning workflow by limiting external interference, and ensuring any currently live hardware within the existing infrastructure is not impacted by the provisioning workflow.

Figure 3:
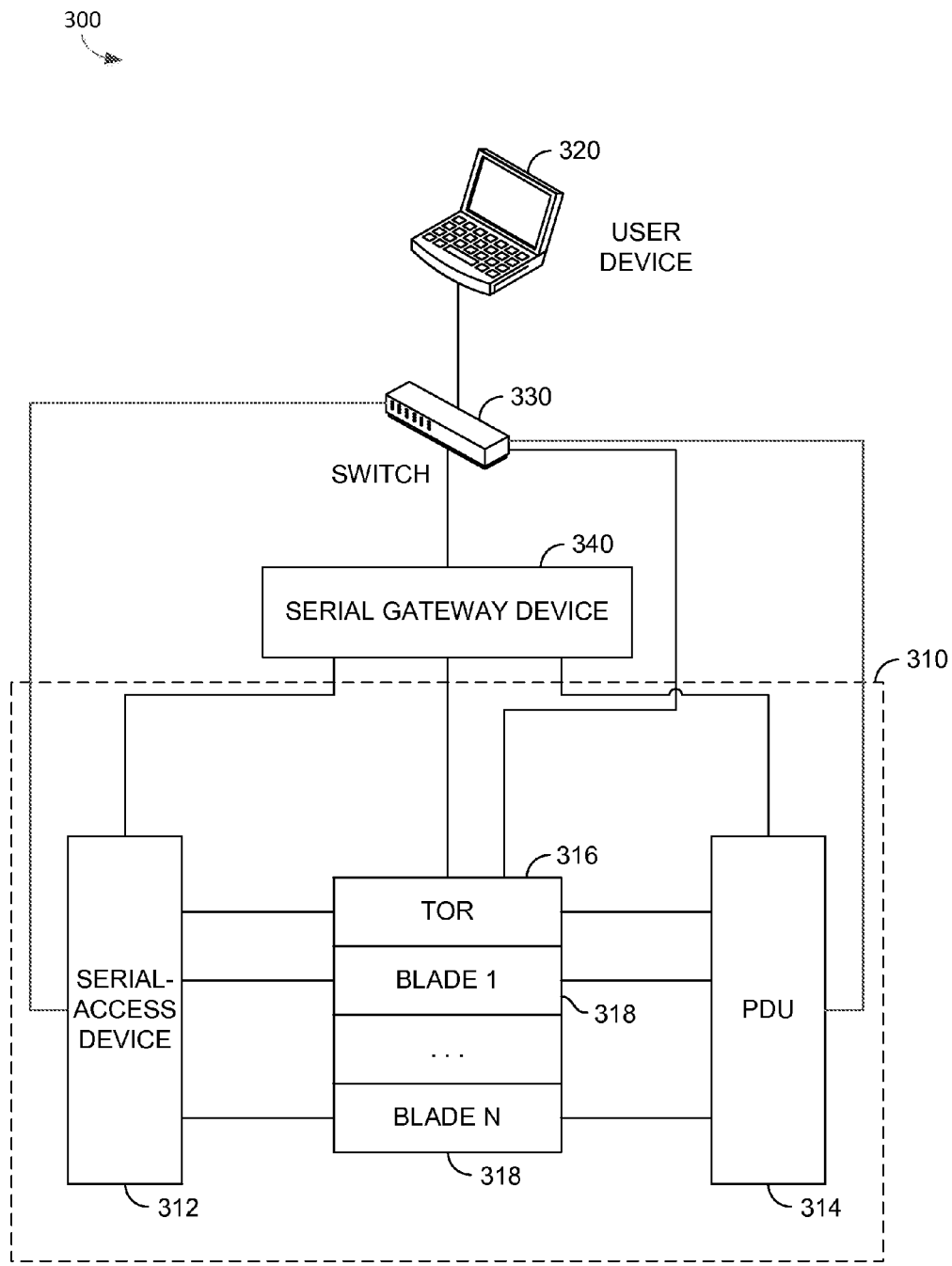
FIG. 3 is a schematic diagram showing an exemplary operating environment for performing automated standalone bootstrapping of hardware inventory, in accordance with embodiments described herein.
Figure 4:
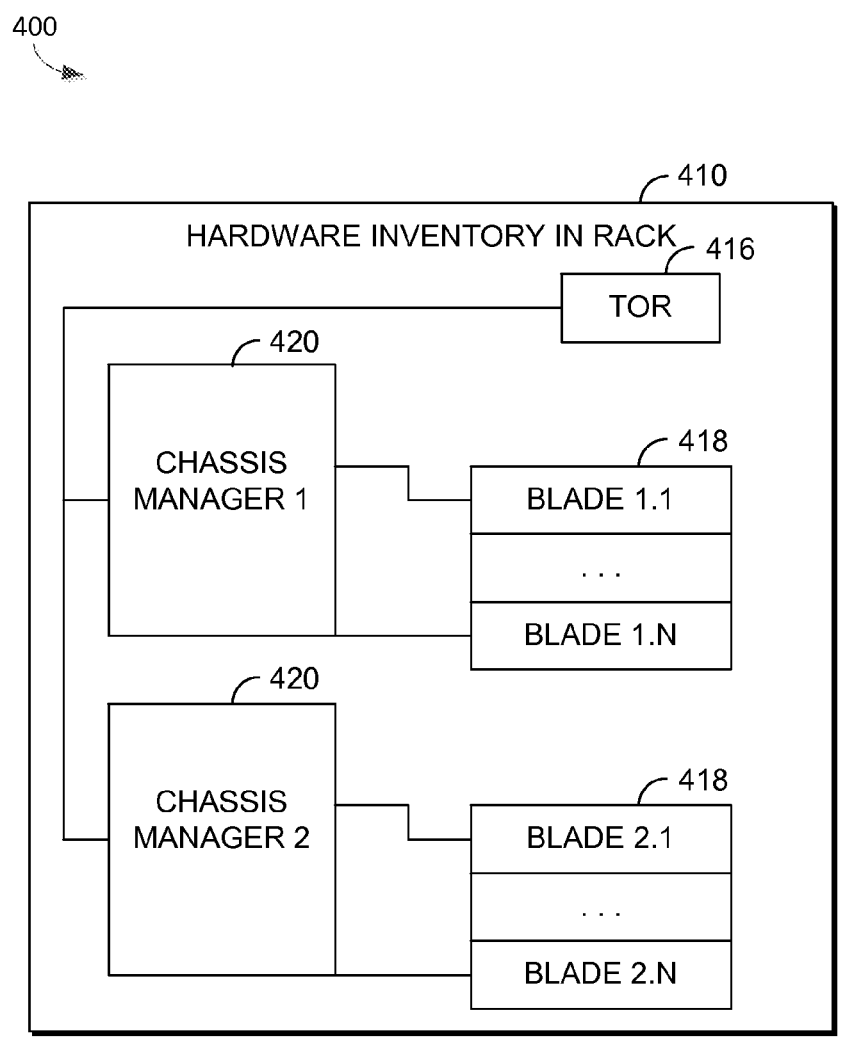
FIG. 4 is a schematic diagram showing an exemplary operating environment for performing automated standalone bootstrapping of hardware inventory, in accordance with embodiments described herein.

With continued reference to FIG. 3, the provisioning ecosystem 300 includes the user device 320 for linking to and controlling functionality of the hardware inventory 310. With respect to the hardware inventory 310 (e.g., high-density rack), there exists a power distribution units (PDU) 314, computing units/devices (e.g., blades 318), and network devices (e.g., TOR switch 316, serial-access device 312). In one embodiment, a PDU may be replaced with an out of band power source that provides autonomous power and also management, and monitoring capabilities. By way of example, an Intelligent Platform Management Interface (IPMI) can support remote power on, off, cycle, hard reset, get a power status query, perform a pulse diagnostic interrupt, or initiate a soft-shutdown of the OS through the IPMI over LAN protocol. iDRAC from DELL INCORPORATED and Integrated Lights Out (iLo) form HP may also support out-of-band management including power management.

It should be noted that there may be additional TOR switches per rack (e.g., upper and lower TOR devices). By way of example, they may be a backend TOR switch. Upper/Lower TOR switches may be utilized to combine physical racks into logical rack concepts (e.g., save physical space but have double the density). Other variations and combinations of TOR switches are contemplated with embodiments described herein. Further, the computing devices 318 are designed as processors to carry out computing/storage tasks and are configured by OEM to individually generate data packets upon respectively receiving power, while the PDUs are designed to selectively supply power to the computing devices 318. The TOR switch 316 is configured for sending data packets over the network-based connection, while the serial-access device 312 is configured for invoking generation of the data packets upon receiving instructions over the serial-based connection. In embodiments, the serial-access device 312 may be used to configure devices within the rack (e.g., PDUs, TOR switches, and blades).

The user device 320 includes configuration software (e.g., provisioning service) that is designed to drive the provisioning workflow. The configuration software is communicatively coupled to the TOR switch 316 via the network-based connection (in-band channel) and to the serial-access device 312 via the serial-based connection (out-of-band channel). In embodiments, the provisioning workflow comprises: discovering the network devices (TOR switch 316 and serial-access device 312) and the set of blades (computing devices 318); and validating a location of the set of blades by comparing information carried within the data packets against a template file that describes a physical topology of the hardware inventory 310. As discussed above, the template file is generated upon completing the phase of specifying the initial set-up of the hardware inventory 360.

The serial-access device 312 is further configured to receive the instructions from the configuration software and, upon processing the instructions, control the PDU 314, respectively. In one instance, controlling the PDU 314 involves conveying instructions thereto. Upon receiving and reading the instructions, the PDU 314 may be configured to deliver power to at least one selected blade of the computing devices 318 and to withhold power from at least one nonselected blade of the computing unit 318. In response, the selected blade(s) may commence generation of data packets that are aggregated at the TOR switch 316 and subsequently at the switch 330 before being routed to the configuration software.

On the other hand, the nonselected blade(s) will likely abstain from sending data packets. Thus, the configuration software is able to confirm the internal connections between the network devices 330, 340, and 312, the computing unit 318, and the PDU 314 as a function of a comparison between a location the blades selected by the instructions and the origination addresses of data packets being generated within the hardware inventory. Additionally the computing unit 318 may be configured to emit data over the serial output to the serial-access device 312, which are then able to validate the internal connection from blades to serial pathways, and to PDU 314.

Although various different configurations of network devices 330, 340, and 312 have been described, it should be understood and appreciated that other types of suitable devices and/or machines that distribute or aggregate messages may be used, and that embodiments of the present invention are not limited to the serial-access device 312 and TOR switch 316 described herein. For instance, a single serial-access device may be provided for the entire hardware inventory rack 310, where the serial-access device acts as a serial connection/interface to the PDU 314, and acts as a serial connection/interface to each of the blades. In another instance, a serial access device and a PDU may be combined into a single device (e.g., a chassis manager) as discussed in more detail below. In yet another instance, the TOR switch 316 may be replaced with a specialized blade that has Ethernet interface capability.

Accordingly, the discovery and validation phase may be carried out using any number of network devices such that at least one network device includes in-band capabilities for network communication and at least one network device includes out-of-band capabilities for serial communication. Or, if the out-of-band capabilities are employed over the Ethernet, then a secondary network switch may be used in place of the serial device. In this way, the in-band capabilities compliment the out-of-band capabilities and allow for debugging and diagnosis of the network devices, as well as continued access to the computing unit 318, if one of the capabilities falls offline.

It will be understood and appreciated by those of ordinary skill in the art that the ecosystem 300 shown in FIG. 3 is merely an example of one suitable portion of an environment for carrying out phases of the provisioning workflow is not intended to suggest any limitation as to the scope of use or functionality of embodiments described herein. Neither should the ecosystem 300 be interpreted as having any dependency or requirement related to any single resource or combination of resources illustrated therein. Further, although the various blocks of FIG. 3 are shown with lines for the sake of clarity, in reality, delineating various components is not so clear, and metaphorically, the lines would more accurately be grey and fuzzy.

The hardware inventory 310 includes various equipment/resources interconnected to the user device 320 via serial-based connections and/or network-based connections. This equipment/resources, as described herein, may include software components (e.g., installed in the network devices) as well as tangible hardware inventory 310 and the user device 320. The equipment/resources may be in a distributed manner placed across various physical resources, thus, the user device 320 may recognize a location of the equipment/resources through the discovery and validation phases in order to establish communication therebetween.

The exemplary system architecture of the provisioning ecosystem 300 includes the user device 320 and the computing unit 318. Each of these devices 320 and 318, shown in FIG. 3 may take the form of various types of computing devices, such as, for example, computing device 100 described above with reference to FIG. 1. By way of example only and not limitation, the devices 320 and 318 may be a personal computer, desktop computer, laptop computer, consumer electronic device, handheld device (e.g., personal digital assistant), various servers, blades, and the like. It should be noted, however, that the invention is not limited to implementation on such computing devices, but may be implemented on any of a variety of different types of computing devices within the scope of embodiments of the present invention.

Typically, each of the devices 320 and 318 include, or is linked to, some form of a computing unit (e.g., central processing unit, microprocessor, etc.) to support operations of the component(s) running thereon (e.g., originating data packets upon receiving a signal or being supplied power). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 320 and 318 to enable each device to perform communication-related processes and other operations.

In another instance, the computing unit may encompass a processor (not shown) coupled to the computer-readable medium accommodated by each of the devices 320 and 318. Generally, the computer-readable medium stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., reconstructing the physical gestures by presenting animations of the motion patterns).

Also, beyond processing instructions, the processor may transfer information to and from other resources that are integral to, or disposed on, the devices 320 and 318. Generally, resources refer to software and hardware mechanisms that enable the devices 320 and 318 to perform a particular function. By way of example only, the resources may include one or more of the following mechanisms: configuration software (e.g., provisioning service); a template file; and components residing within the computing unit 318.

An exemplary provisioning workflow for discovering and validating the network devices 330, 340, and 312, and the computing unit 318 (e.g., blades) within the ecosystem 300 will now be discussed with reference to FIG. 3. Initially, the configuration software attempts to gain access to the hardware inventory 310 via the serial gateway device 320 of the serial-based connection. Once access is gained, an identification of the serial gateway device 320 ports that are linked to serial-access devices (e.g., serial-access device 312) of the hardware inventory 310 is made. Signals are then sent through serial-based connections from the identified ports to discover the serial-access device 312. The information extracted from the discovered serial-access device 312 is cross-referenced against the template file. As more fully discussed above, the template file includes the following: a topology schema that represents a blueprint of the expected devices (e.g., devices 330, 340, 316, and 312) and the expected wiring there between; and a hardware schema that defines the components that are expected to reside within each of the computing unit 318.

Upon discovering the serial-access device 312 as being properly connected via the serial gateway device 320, the configuration software may distribute instructions over the serial-based connection to the serial-access device 312. The distributed instructions, once processed by the serial-access device 312, allow the configuration software to access the TOR switch 316 and the PDU 314 via internal coupling of the hardware inventory in the rack. Upon reaching the PDU 314, the configuration software may provide instructions that selectively control power to the computing unit 318. It should be noted, in embodiments, that prior to controlling the serial-access device 312 and PDU 314, the configuration software may validate the devices, may validate the software on these devices (e.g., ensuring the firmware and OS are supported versions), and may configure these devices to the specification(s) required for acceptance by the cloud service.

For instance, selectively controlling power may involve turning off power to each of the computing unit 318, targeting one or more of the computing unit 318 listed in the template file, and turning on power to the targeted computing device(s). Once power is supplied to the targeted computing device(s), data packets may be generated and sent from the targeted computing device(s). The data packets are then aggregated at the TOR switch 350, which may scan a range of ports allocated for receiving data packets from the computing unit 318 and identify the port(s) from the port range that is actually receiving the data packets. Also, the TOR switch 316 may identify an address (e.g., MAC address or IP address) that is previously assigned thereto. Upon gathering this information, the TOR switch 316 may append the identified port(s) and/or the identified address to the data packets before routing them back to the configuration software via the switch 330 over the network-based connection.

The configuration software is designed to capture the data packets from a flow of traffic being sent from the hardware inventory 310. Further, the configuration software is designed to validate the computing unit 318. Validation may involve one or more of the following steps: extracting information (e.g., address of the targeted computing device(s) and TOR switch 316, and ports on the TOR switch 316 and the serial-access device 312 identified as being internally coupled to the targeted computing device(s)) carried within the data packets; and comparing the extracted information against the template file to confirm internal coupling matches the topology scheme and the addresses for proper operational settings. Proper addresses may include several unique identifiers of components (e.g., MAC/serial/ asset numbers/static IPs) that are compared for uniqueness between each other. It is contemplated that unique identifiers may simply be collected to be provide for other services (e.g., billing or invoicing) and specifically for uniquely identifying the hardware inventory for RMA or human investigation.

Further, the data packets may deliver information that provides the configuration software with an insight to the components, as well as the configuration settings applied to the components, presently residing on the targeted computing device(s). These delivered configuration settings may be compared against expected configuration settings maintained within the hardware schema of the template file. The reconfiguration of the targeted computing device(s) may be prompted when the delivered configuration settings do not correspond with the expected configuration settings. This reconfiguration may be performed via the serial-access device 361 or via the network connection through the TOR switch 350.

It should be appreciated and understood that the steps above for discovering and validating the network and hardware devices may be executed iteratively such that the computing unit 318 and the network devices 330, 330, and 316 may be targeted recursively to validate location of and connections to each of the devices 318, 330, 340, and 316 in succession. Thus, the entire wiring pattern of the hardware inventory 310 may be distilled from simply repeating the steps above.

In embodiments, the procedure of reconfiguring, or initially configuring blank devices, may be conducted during or after the discovery and validation steps described herein. Initially, a driver development kit (DDK) may be provided that describes the interfaces of the network and hardware devices, which an original equipment manufacturer (OEM) may employ to implement drivers within network and hardware devices of the hardware inventory prior to delivery. For example, the service provider of a data center may provide the OEM with the DDK, where the OEM is contracted to install drivers on the appropriate network and hardware devices according to the DDK. In operation, the implemented drivers facilitate interaction between the network and hardware devices and allow the configuration software to control the serial-access device 312 by sending instructions thereto.

These drivers, as well as other attributes of components, within the network and hardware devices may be inspected during the validation discovery phase. In embodiments, the inspection may identify a type of firmware and/or operating system (OS) installed on the network and hardware devices, if already presently installed. If the type of firmware and/or OS presently installed is inappropriate with respect to the template file, the reconfiguring procedure is invoked. In an exemplary embodiment, the reconfiguring procedure is carried out by implementing the following workflow: flushing out the presently installed firmware and/or OS; and deploying a maintenance OS, where the maintenance OS allows for a rapid install and ensures the appropriate drivers and components appear on the network and hardware devices in order to accomplish validation. In one embodiment, the user device 310 is the configuration software can further facilitate implementing the deployment and integration phase of a bootstrap process.

With reference to FIG. 4, a provisioning ecosystem 400 is illustrated for performing methods of standalone bootstrapping hardware inventory as described with reference to FIG. 3. In particular, the provisioning ecosystem 400 includes hardware inventory 410, chassis manager 420, TOR switch 416, and blade 418. The chassis manager 420 features an integrated PDU and serial device within the chassis manager, which performs provisioning operations of the provisioning workflow. As discussed above, an implementation may include a blade in the hardware inventory selected and/or configured to performing provisioning operations. The provisioning operations may be similar to the provisioning operations discussed with reference to the user device 320, the serial-access device 312, and the PDU 314. In this regard, the chassis manager 410, which may also be integrated into the physical rack framework of the hardware inventory, provides the functionality of a PDU, serial device, and a user device in an integrated manner. The integrated functionality of the chassis manager 420 advantageously provides standalone hardware inventory having the chassis manager 420 executing provisioning operations without the need for additional hardware or configuration.

In particular, the chassis manager 320 is configured to execute configuration software (e.g., provisioning service) within an operating system on the chassis manager. It is contemplated that the configuration software may be part of the chassis manager file system such as installation files (e.g., an image file) or application files that function with the operating system of the chassis manager such that the chassis manager automatically has access to the resource for performing the provisioning workflow. For example, the file system includes support for provision operations for power distribution and serial access to the hardware inventory. The configuration software running in the operating system can be configured to run automatically when the rack receives power. In the regard, the hardware inventory 410 can operate with little or no additional human intervention, hardware, or deployment. The provisioning service can automatically execute at a factory floor, at delivery time, or upon hardware replacement. The chassis manager can execute the hardware inventory validation functions in parallel with the cabling validation functions to minimize time for validations and repair.

The chassis manager 420 is configured to perform a provisioning workflow using the provisioning service that excludes production-enabled hardware. The provisioning ecosystem 400 having the chassis manager 420 can include a wiring configuration that supports excluding the production-enabled hardware. By way of example, the wiring configuration can include the TOR management connection plugged into the TOR switch itself (e.g., using one of the open or uplink ports). The TOR out of band (serial) connection can be plugged into the chassis manager 420. The chassis manager can configure TOR switches through a management network, serial-access device, or through a loopback IP address within a network. In an embodiment with more than one chassis manager, the TOR connection can be plugged specifically into a designated first chassis manager. The designated first chassis manager is configured to support the provisioning service via a TOR management port in order to begin wire-checks and validation operations. As discussed above, the chassis manager can also connect to a secondary network and obtain an OOB channel into the rack that is independent of the TOR switch. The chassis manager may configure the TOR switch through the secondary network. It is contemplated that a single chassis manager or multiple chassis managers may support all hardware inventory within a rack.

Further, the hardware inventory 410 in the rack, are configured with factory default credentials such that production-enabled hardware is not mistakenly validated via the provisioning service. In this regard, the chassis manager 420 explicitly checks for default credentials as discussed below. It is contemplated that a production service may operate to validate the rack for integration into production upon completion of an independent provisioning workflow as discussed herein. In addition, the production service may also use the validation service via a chassis manager, for example, to extend the validation and RMA capabilities. As such, the production service can support validation, RMA, and incorporating hardware inventory in a scalable manner. Additionally, the provisioning ecosystem is scalable with each chassis manager 320. Specifically, each chassis manager may be configured to act as an independent DHCP/Pre-boot Execution Environment (PXE)/Trivial File Transfer Protocol (TFTP). DHCP for dynamically distributing network configuration parameters, such as IP addresses for interfaces and services, PXE for booting hardware inventory, and TFTP that supports automated transfer of configuration or boot files between hardware inventory in the provisioning ecosystem. Each chassis manager can be configured with SKU information of the hardware inventory 310 in the RACK. The SKU information can be installed in the chassis manager upon assembly.

Although various different configurations of hardware inventories have been described, it should be understood and appreciated that other types of suitable machines that allow for increasing storage/computing capacity and suitable devices that route traffic between the machines may be used, and that embodiments of the present invention are not limited to the layouts of the ecosystems 300 and 400 described herein. That is, various other types of physical topologies of devices may appear within the hardware inventory 310 and 410, which are considered by embodiments.

In accompaniment to varying topologies, the template file may vary correspondingly, such that the procedure for cross-referencing and validation may adapt to modifications in wiring (network schema) and changes in devices (hardware schema). Consequently, as opposed to entirely rewriting the validation code each time a modification is made to the physical topology of a new hardware inventory 310 or 410 to be provisioned, a new template file is simply generated based on the new hardware inventory 310 or 410 while the provisioning workflow for validating the network and hardware devices remain unchanged in procedure. Thus, the ability to apply provisioning workflow to various physical topologies that presently exist—as well as to those that have not been yet developed—without overhauling the workflow allows for provisioning hardware inventories beyond a standard, uniform set-up of wiring and devices.

Figure 5A:
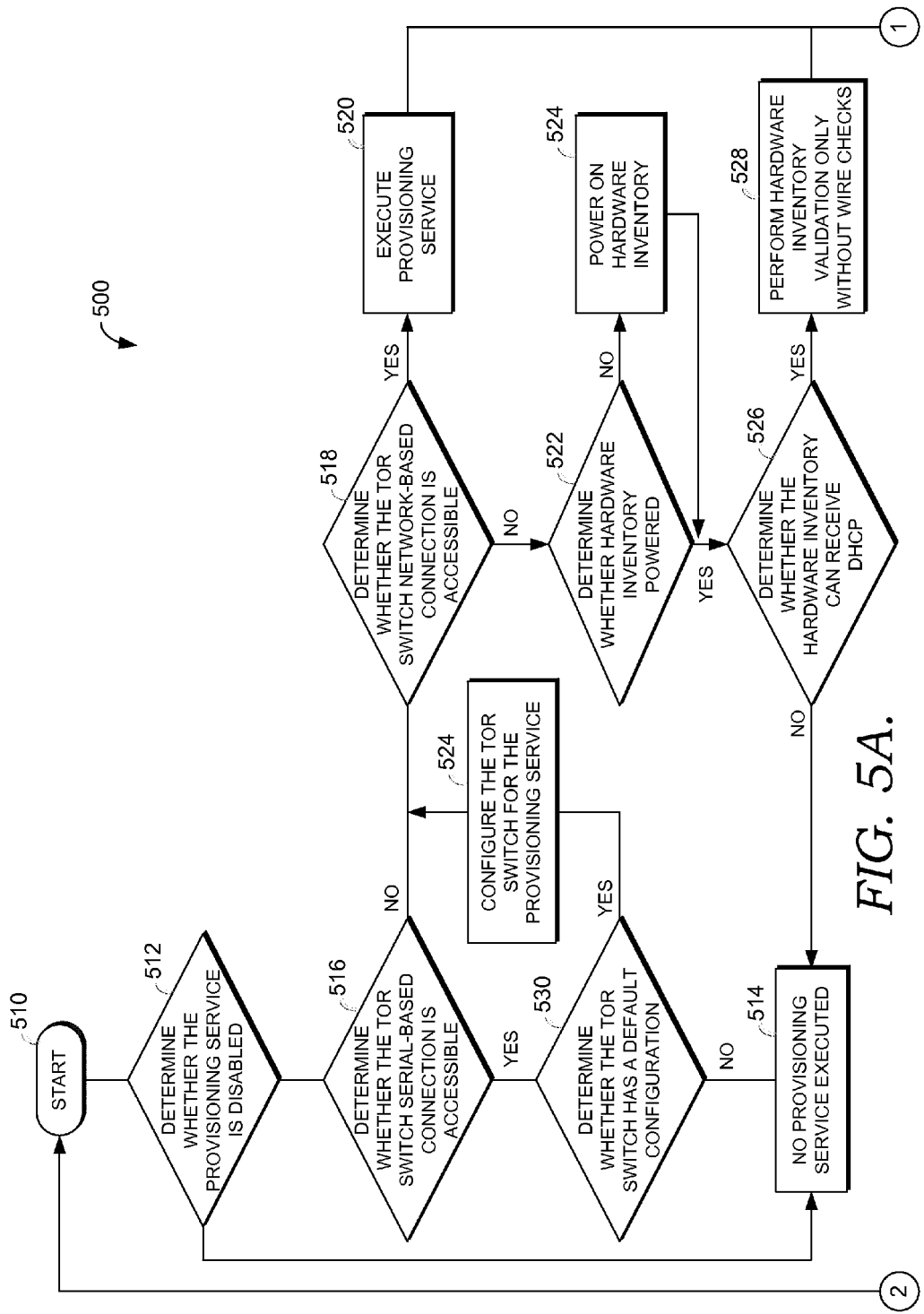
FIGS. 5A-B are a flow diagram showing a method for performing automated standalone bootstrapping of hardware inventory in accordance with embodiments described herein.
Figure 5B:
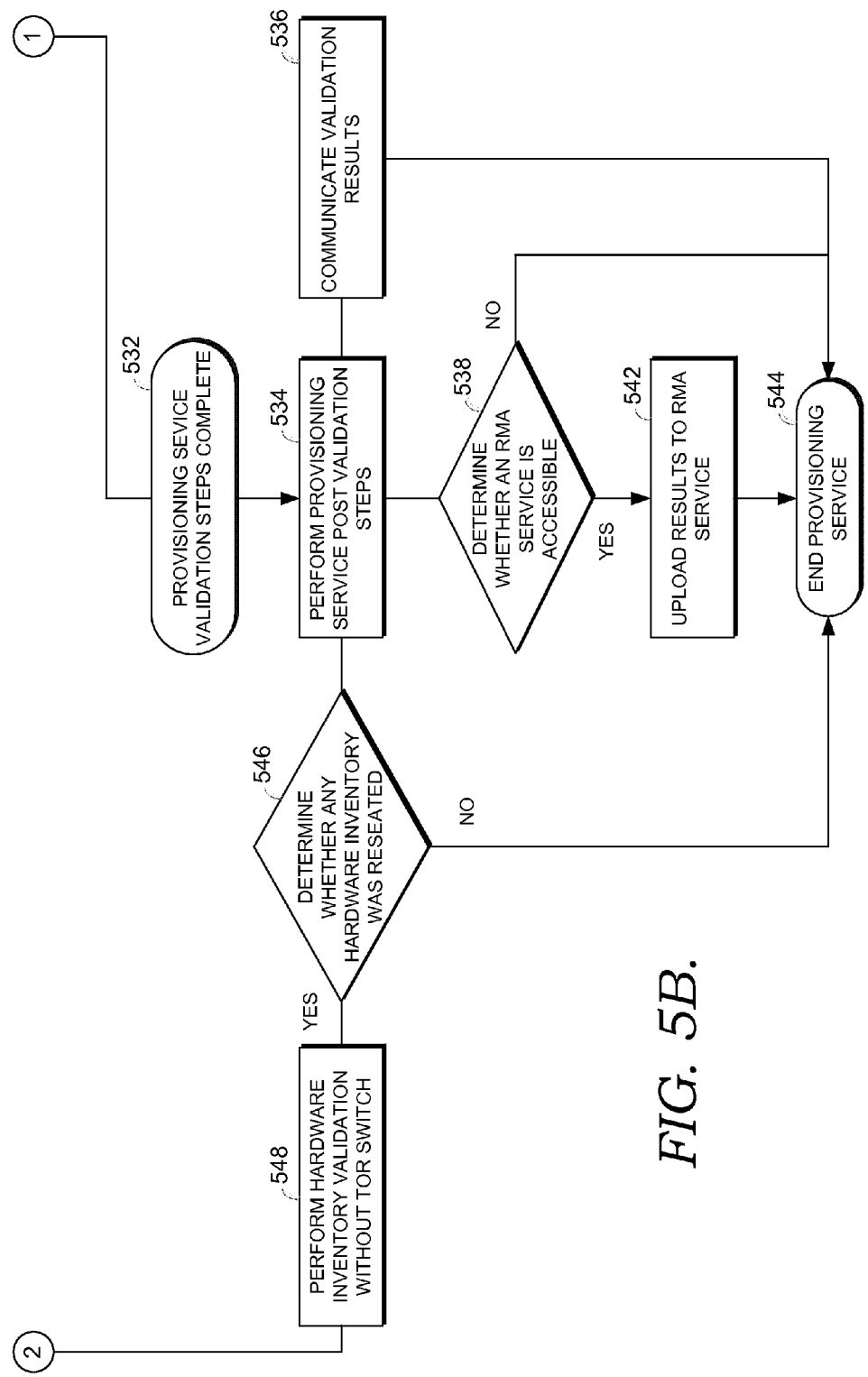

With reference to FIGS. 5A and 5B, a flow diagram is shown that illustrates a method for provisioning a hardware inventory. In particular, the method functions to provide a mechanism to control whether a provisioning workflow is invoked to prevent interactions with an external infrastructure. External infrastructure may refer to one or more computing components actively in production supporting services of the datacenter. At block 510, a determination is made whether the provisioning workflow (e.g., the provisioning service) is disabled. Determining whether the provisioning workflow is disabled can be based on hardware or software components that are configured to indicate to a user device or a chassis manager whether the provisioning workflow should or should not be implemented. When it is determined that the provisioning workflow is disabled, the provisioning workflow is not performed, as shown at block 514—no provisioning service executed. It is possible to implement overrides for enabling a disabled provisioning workflow to force the provisioning service to be executed. Further, when it is determined that the provisioning workflow is enabled, additional steps are performed to facilitate proceeding with the provisioning workflow.

At block 516, a determination is made whether a TOR switch is accessible via a serial-based connection. When the TOR switch is not accessible via a serial-based connection, a determination is made whether the TOR switch is accessible via a network-based connection, as depicted in block 518. When the TOR switch is accessible via a network-based connection, the provisioning workflow may be performed in accordance with methods described herein, as depicted at block 520—execute provisioning service. When the TOR switch is not accessible via a network-based connection, a determination is made whether the hardware inventory is powered, as depicted at block 522. When the hardware inventory is not powered, an operation is performed to power on the hardware inventory, at block 524. Upon powering on the hardware in inventory, or upon determining that the hardware inventory is powered, a determination is made whether the hardware inventory can receive DHCP assignments, as depicted at block 526. When it is determined that the hardware inventory cannot receive DCHP assignments, the provisioning workflow is not performed, as shown at block 514. However, when it is determined that the hardware inventory can receive DHCP assignments, hardware inventory validation checks can be performed without any wire checks, as depicted at block 528. Hardware validation checks without wire checks may advantageously be performed when individual hardware inventory or a subset of the hardware inventory need to be validated without performing an entire rack validation.

With reference to block 516, when it is determined that the TOR switch serial-based connection is accessible, then a determination is made whether the TOR switch has a default configuration, as depicted at block 530. When it is determined that the TOR switch has a default configuration, the TOR switch is configured for the provisioning service such that it continues the provisioning workflow at block 518. A default configuration may also refer to a configuration that excludes a production infrastructure configuration such that the TOR switch and rack are securely isolated. For example, a password comparison may be performed to determine whether a password match exists, in that, when a match exists, the rack configuration likely matches a production configuration and appropriate action can be taken thereafter. However, when it is determined that the TOR switch does not have a default configuration, provisioning workflow is not performed, as shown at block 514—no provisioning service executed.

Upon completion of the operations at blocks 520 and 528, and with reference to FIG. 5B, block 532 depicts the provisioning workflow being completed and continuing at block 534 with performing provisioning service post validation steps, that may selectively include one or more blocks 536, 538, and 540. At block 536, the validation results are communicated using one or more reporting mechanism associated with one or more interfaces. The validation results include the outcomes of the validation of the hardware inventory. For example, the validation results may identify a blade, the internal configuration of the blade, and wiring of the blade. In particular, the validation results may show whether or not a particular component in the hardware inventory is configured according to the expected topology schema in the template file. In this regard, difference between the expected topology schema features and the actual topology of the hardware inventory can be highlighted. Additionally, any configuration changes that may have been completed to align the actual hardware topology with the expected topology may also be included in the validation results. Other variations and combinations of validation results are contemplated with embodiments of the present invention.

The validation results are communicated using a reporting mechanism (e.g., a module or component of the provisioning service) that could include the routines or procedures associated with receiving and communicating the validation results via an interface. The validation results may be identified at the user device or chassis manager and communicated for display via an interface integrated with the user device or chassis manager. The validation results may also be communicated (e.g., using a network interface) as a validation file that can be accessed and evaluated. It is contemplated that validation results may also be communicated using a lighting interface (e.g., LEDs) of the hardware inventory. For example, any hardware inventory that failed one or more of the validation may be associated with a light indicator having a selected color (e.g., red) to visually communicate the result and/or status of validation results associated with the hardware inventory. Other variations and combinations of interfaces for communicating validation results are contemplated with embodiments of the present invention. Upon communicating the validation results the provisioning workflow may be terminated as depicted at block 544—end provisioning service.

At block 538, a determination is made to determine whether a return merchandise authorization (RMA) service exists. An RMA service can include a process of identifying hardware inventory in order to return the hardware inventory to receive a refund, replacement or repair. An RMA service may be associated internally at the provisioning service or it may accessible via the provisioning service at an external component that supports the RMA service routines and procedures. When it is determined that an RMA service exists, validation results are uploaded to the RMA service, as depicted at 544. For example, unreachable hardware inventory can be identified in the validation results or an incorrect configuration that could not be reconfigured could be identified in the validation results and uploaded into the RMA service to further processing. Upon uploading the results to the RMA service or when it is determined that an RMA service does not exist, provisioning workflow ends, as depicted at block 544—end provisioning service.

At block 546, a determination is made whether any hardware inventory was reseated. Specifically, wiring or hardware inventory issues may be detected after the first run of the wire-checker or validation operation. The hardware inventory issues may be resolved by human investigation that includes troubleshooting and fixing identified problems. During human investigations, multiple hardware inventory devices (e.g., network devices or blades) could be impacted (e.g., reseated) which can potentially cause issues with the reseated hardware inventory. As such, reseated hardware inventory may be detected by the provisioning service and re-validated. Upon determining that no hardware inventory was reseated, the provisioning workflow ends, as depicted at block 544—end provisioning service. When it is determined that hardware inventory was reseated, at block 548, a hardware inventory validation is performed with the TOR switch which returns the processing workflow back to the start. In particular, the provisioning workflow can detect replaced or modified devices through reseated behavior in order to restart the provisioning workflow for re-validation, as shown in FIG. 5A.

Figure 6:
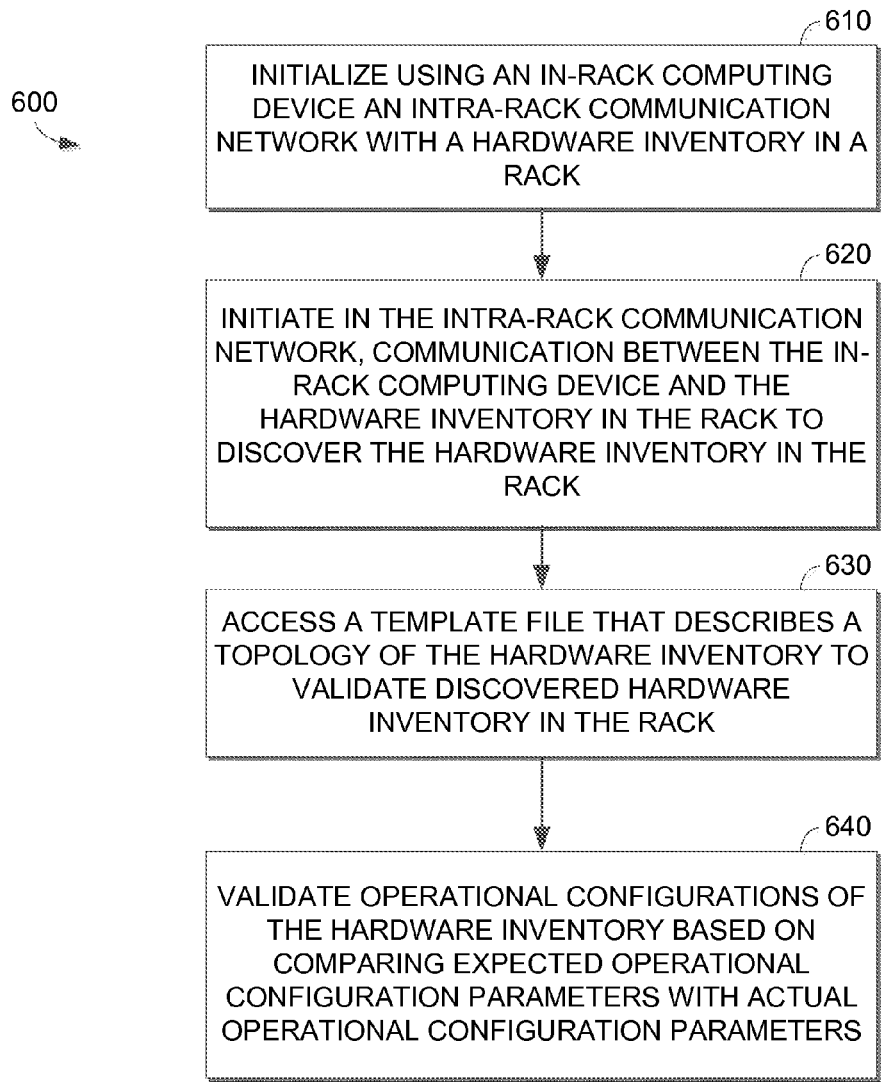
FIG. 6 is a flow diagram showing a method for performing automated standalone bootstrapping of hardware inventory in accordance with embodiments described herein.

Referring now to FIG. 6, a flow diagram is shown that illustrates an overall method 600 for standalone bootstrapping hardware inventory in racks. Although the terms "step" and/or "block" may be used herein to connote different elements of methods employed, the terms should not be interpreted as implying any particular order among or between various steps herein disclosed unless and except when the order of individual steps is explicitly described.

Initially, the hardware inventory represents a rack or set of racks, where the rack may include a network device (e.g., top-of-rack switch and serial-access device) and a set of computing units (e.g., set of blades inserted into the rack). The set of blades are typically interconnected between the serial-access device and the TOR switch.

The method 600, as depicted at block 610, may involve initializing using a chassis manager, an intra-rack communication network with a hardware inventory in a rack. The method may further involve initiating, in the intra-rack communication network, communication between the chassis manager and the hardware inventory in the rack to discover the hardware inventory in the rack, as depicted at block 620. The intra-rack communication comprises traffic, received from a set of computing units. Advantageously, the intra-rack communication and hardware inventory is securely isolated from an external infrastructure. The method includes the chassis manager validating operational configurations of the hardware inventory. In embodiments, the chassis manager, as depicted at block 630, accesses a template file that describes a topology schema of the hardware inventory. At block 640, the method includes validating operational configurations of the hardware inventory based on comparing expected operational configuration parameters with actual operational configuration parameters, at least a portion of the operational configuration parameters compared based on the template file and the information carried within the data packets received from the set of computing units. In embodiments, the method involves validating locations of the set of computing units, respectively, by comparing the template file against information carried with in the traffic received from the set of computing units.

Figure 7:
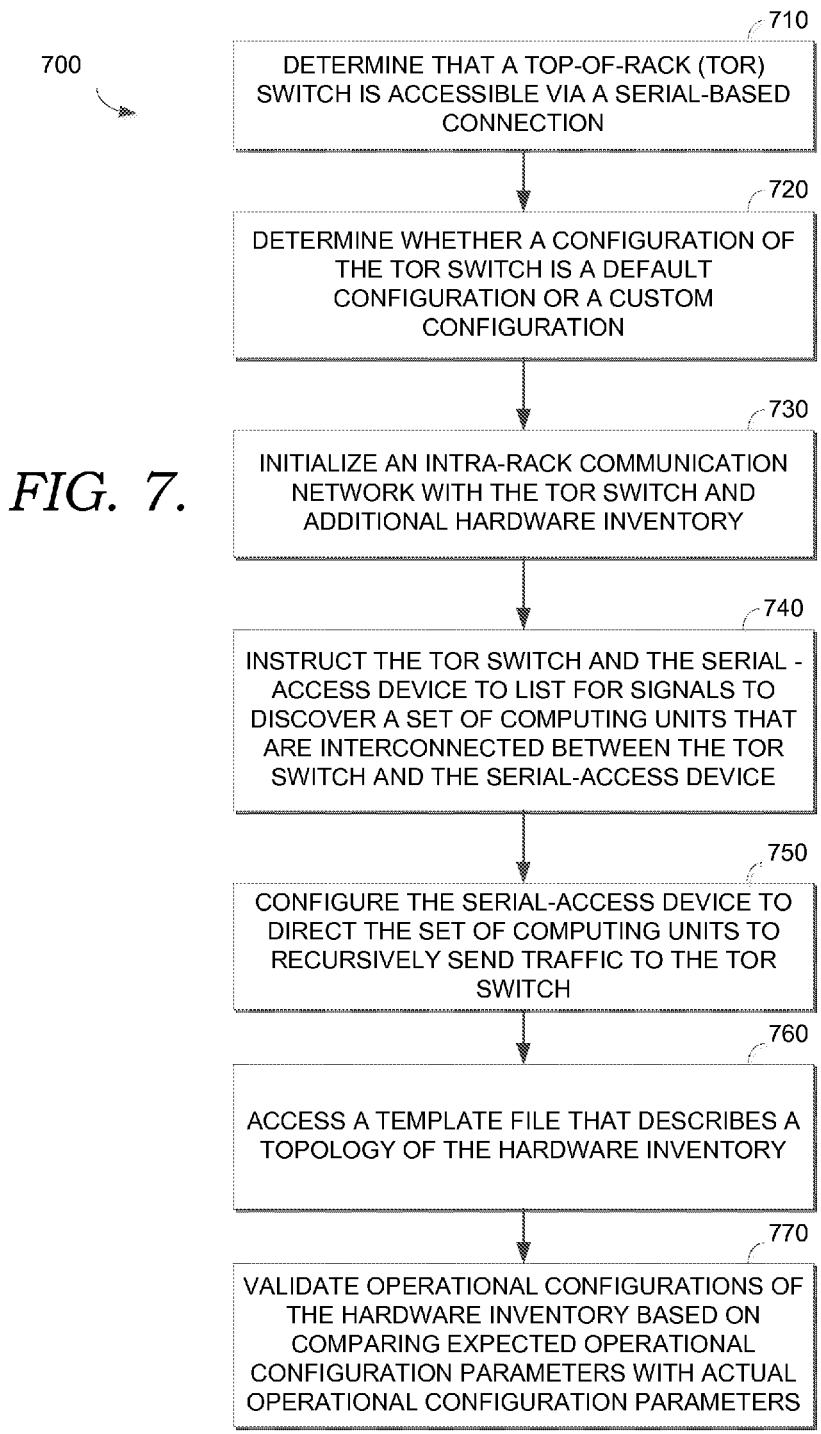
FIG. 7 is a flow diagram showing a method for performing automated standalone bootstrapping of hardware inventory in accordance with embodiments described herein.

Turning now to FIG. 7, a flow diagram is shown illustrating a method for standalone bootstrapping rack hardware inventory. The method 700 includes determining that a top-of-rack (TOR) switch is accessible via a serial-based connection, as depicted at block 710. Also, the method includes determining whether a configuration of the TOR switch is a default configuration or a custom configuration, as depicted at block 720. When the TOR switch is in a default configuration the provisioning service proceeds with provisioning the TOR switch for discovery, validation, and configuration of the hardware inventory, and when the TOR switch is in a custom configuration the provisioning service terminates provisioning the TOR switch. The method may further involve initializing an intra-rack communication network with the TOR switch and additional hardware inventory in the rack, as depicted at block 730.

Further, as depicted at block 740, the method includes instructing the TOR switch and the serial-access device to listen for signals to discover a set of computing units that are interconnected between the TOR switch and the serial-access device. As depicted in block 750, the method includes configuring the serial-access device to direct the set of computing units to recursively send traffic to the TOR switch. The method further includes, as shown at block 760, accessing a template file that describes topology of the hardware inventory. As depicted at block 770, the method also includes validating operational configurations of the hardware inventory based on comparing expected operational configuration parameters with actual operational configuration parameters, at least a portion of the operational configuration parameters compared based on the template file and the information carried within the data packets received from the set of computing units Embodiments of the presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method for standalone bootstrapping hardware inventory in racks, the method comprising:

initializing, using an in-rack computing device, an intra-rack communication network with a hardware inventory in a rack;

initiating, in the intra-rack communication network, communication between the in-rack computing device and the hardware inventory in the rack to discover the hardware inventory in the rack, wherein intra-rack communication comprises traffic received from a set of computing units; and validating operational configurations of the hardware inventory based on comparing expected operational configuration parameters with actual operational configuration parameters of the hardware inventory determined based at least in part on:

accessing a template file that describes topology of the hardware inventory to validate discovered hardware inventory in the rack;

receiving a data packet from the at least one selected computing unit;

using the data packet to identify operational configuration parameters of the set of computing units; and comparing identified operational configurations parameters with the expected operational configuration parameters of the hardware inventory, a portion of the expected operational configuration parameters retrieved from the template file.

2. The method of claim 1, wherein the in-rack computing device is a chassis manager, wherein the chassis manager is communicatively coupled to the hardware inventory and physically coupled to the hardware inventory via a physical structural frame of the rack.

3. The method of claim 1, wherein the in-rack computing device is a computing unit selected from the set of computing units, wherein the computing unit is selected based on a leader election mechanism.

4. The method of claim 1, wherein initializing the intra-communication network is automatically triggered for the rack based on the in-rack computing device receiving power.

5. The media of claim 1, wherein initiating communication further comprises:

sending from the chassis manager signals to a top-of-rack (TOR) switch to discover the hardware inventory;

answering Dynamic Host Configuration Protocol (DHCP) requests from the hardware inventory and assigning IP addresses based on:
collecting media access control (MAC) addresses for the hardware inventory;
adding the MAC addresses to the DHCP server as an eligible candidate for configuring IP addresses;
adding the IP addresses and subnet masks to the DHCP server to be utilized to answer DHCP requests; and
answering DHCP requests from the hardware inventory with dynamically assigned IP addresses; and
establishing network connectivity between the hardware inventory and the chassis manager.

6. The method of claim 1, further comprising, via a reporting mechanism, receiving and communicating status and events associated with a hardware inventory, wherein the status and events are based on the provisioning service validation results.

7. The method of claim 1, wherein the template file includes a topology schema that specifies an expected location of the at least one selected computing unit, and wherein the topology schema is employed by a user device to verify the hardware inventory is properly wired, and wherein the topology schema comprises at least one of wiring rules, device configuration, or device locations.

8. The method of claim 1, wherein the template file includes a hardware schema that specifies which components are expected to reside within the at least one selected computing unit, and wherein the hardware schema is employed by a user device to verify an internal configuration of the at least one computing unit.

9. The method of claim 1, wherein the hardware inventory represents components in the rack, wherein the network device represents a top-of-rack (TOR) switch located within the rack, wherein the set of computing units represents a set of blades inserted into the rack.

10. The method of claim 1, wherein the hardware inventory further comprises a serial-access device and a user device, wherein the set of blades are interconnected between the serial-access device and the TOR switch, wherein hardware inventory intra-rack communication is performed via the serial-access device.

11. One or more computer storage media having computer-executable instructions embodied thereon that, when executed, perform a method for standalone bootstrapping rack hardware inventory, the method comprising:
determining that a top-of-rack (TOR) switch is accessible via a serial-based connection;
determining whether a configuration of the TOR switch is a default configuration or a custom configuration, wherein when a TOR switch is in a default configuration the provisioning service proceeds with provisioning the TOR switch for discovery, validation, and configuration of the hardware inventory, and wherein when a TOR switch is in a custom configuration the provisioning service terminates provisioning the TOR switch;
initializing an intra-rack communication network with the TOR switch and additional hardware inventory in a rack;
instructing the TOR switch and the serial-access device to listen for signals to discover a set of computing units that are interconnected between the TOR switch and the serial-access device;
accessing a template file that describes a topology of the hardware inventory; and validating operational configurations of the hardware inventory based on comparing expected operational configuration parameters with actual operational configuration parameters, at least a portion of the operational configuration parameters compared based on the template file and the information carried within the data packets received from the set of computing units.

12. The media of claim 11, further comprising:
upon receiving power, determining whether the provisioning service is enabled to configure a hardware inventory of a rack, wherein when the provisioning service is enabled to configure a hardware inventory, the provisioning service proceeds with provisioning the hardware inventory, and wherein when the provisioning service is not enabled to configure a hardware inventory, the provisioning service terminates provisioning the TOR switch.

13. The media of claim 11, further comprising, via a reporting mechanism, receiving and communicating status and events associated with a hardware inventory, wherein the status and events are based on the provisioning service validation results.

14. The media of claim 11, wherein the reporting mechanism is associated with one or more interfaces for communicating the validation results, wherein the validation results are communicated based on an interface selected from at least one of: a display interface integrated with a chassis manager, a display interface of a user device, and a network interface.

15. The media of claim 11, determining that a return manufacturer authorization (RMA) service exists such that validation results associated with the hardware inventory are communicated for additional processing based on the RMA service.

16. A computer system for performing a method for standalone bootstrapping rack hardware inventory, the computer system comprising:
a rack;
at least one network device residing within the rack, wherein the at least one network device is selected from:
(a) a top-of-rack (TOR) switch for sending data packets over a network-based connection; and
(b) a serial-access device for invoking generation of the data packets upon receiving instructions over a serial-based connection;
a set of blades inserted within the rack, wherein the set of blades include one or more computing units that are configured to individually generate data packets upon respectively receiving power;
a power distribution unit (PDU) for selectively supplying power to the set of blades; and
at least one provisioning service device, the provisioning service device selected from one of:
a built-in chassis manager that is communicatively coupled to the TOR switch via the network-based connection;
a selected blade from the set of blades that is communicatively coupled to the TOR switch via the network-based connection; and
a user device that is communicatively coupled to the TOR switch via the network-based connection to the serial-access device via the serial-based connection, and
wherein the built-in chassis manager, a selected blade, and the user device are configured to perform provisioning comprising:

(a) discovering the network devices and the set of blades; and (b) validating operational configurations of the set of blades by comparing information carried within the data packets against a template file that describes a topology of the rack, wherein validating operational configurations comprises comparing identified operational configurations parameters in the data packets with expected operational configurations parameters of the hardware inventory, a portion of the expected operational configurations parameters retrieved from the template file.

17. The system of claim 16, wherein provisioning of the rack excludes any serial or management network outside of the rack such that a provisioning workflow is independent of an external infrastructure based on an isolated wiring configuration.

18. The system of claim 16, wherein excluding the serial or management network outside the rack is based on a preliminary configuration of a hardware inventory of the rack, wherein the TOR switch is configured with a static management IP to access the chassis manager or the user device, and the hardware inventory includes factory default settings.

19. The system of claim 16, wherein the PDU and the serial device are integrated into the chassis manager that is communicatively coupled to the TOR switch via the network-based connection such that the chassis manager executes a provisioning service for provisioning in an integrated manner.

20. The system of claim 16, wherein the chassis manager is further configured to independently provide a Dynamic Host Configuration Protocol, a Pre-boot Execution Environment, and a Trivial File Transfer Protocol for the hardware inventory.

* * * * *